United States Patent
Haack et al.

(10) Patent No.: US 10,486,705 B2
(45) Date of Patent: Nov. 26, 2019

(54) SHIFT CONTROL

(71) Applicant: TEAM Industries, Inc., Bagley, MN (US)

(72) Inventors: Jeffrey Joseph Haack, Bemidji, MN (US); Thomas Richard Rosenbush, Bagley, MN (US); Brandon P. Lenk, Shevlin, MN (US)

(73) Assignee: TEAM Industries, Inc., Bagley, MN (US)

( * ) Notice: Subject to any disclaimer, the term of this patent is extended or adjusted under 35 U.S.C. 154(b) by 385 days.

(21) Appl. No.: 15/290,577

(22) Filed: Oct. 11, 2016

(65) Prior Publication Data

US 2017/0101104 A1    Apr. 13, 2017

Related U.S. Application Data (60) Provisional application No. 62/240,350, filed on Oct. 12, 2015.

(51) Int. Cl.
*B60W 30/19* (2012.01)
*B60W 10/02* (2006.01)
(Continued)

(52) U.S. Cl.
CPC ............ *B60W 30/19* (2013.01); *B60W 10/02* (2013.01); *B60W 10/06* (2013.01); *B60W 10/11* (2013.01);
(Continued)

(58) Field of Classification Search
CPC .... B60W 30/02; B60W 30/19; B60W 30/182; B60W 30/18027; B60W 10/02;
(Continued)

(56) References Cited

U.S. PATENT DOCUMENTS

| 6,231,477 B1 | 5/2001 | Hollingsworth et al. |
| 2011/0118915 A1* | 5/2011 | Ortmann ................. B60K 6/48 701/22 |

FOREIGN PATENT DOCUMENTS

| DE | 10327438 | 1/2004 |
| EP | 1529989 | 5/2005 |
| EP | 2716937 | 4/2014 |

OTHER PUBLICATIONS

International Search Authority, "International Preliminary Report on Patentability for PCT Application No. PCT/US2016/056409", dated Apr. 26, 2018, "from Foreign Counterpart of U.S. Appl. No. 15/290,577", dated Apr. 26, 2018, pp. 1-8, Published in: WO.

(Continued)

*Primary Examiner* — Huan Le
(74) *Attorney, Agent, or Firm* — Fogg & Powers LLC (57) ABSTRACT

A shift control is provided. The shift control includes an operator input, a memory and a controller. The memory is used to store a plurality of shifting maps. Each shifting map is associated with a select input signal received from the operator input. At least some of the shifting maps include launch aggressiveness parameters based on anticipated vehicle use. The controller is in communication with the operator input and the memory. The controller is configured to control shifting of a transmission based at least in part on a shifting map stored in the memory associated with an input signal received from the operator input.

19 Claims, 6 Drawing Sheets

(51) Int. Cl.
| | |
|---|---|
| *B60W 10/06* | (2006.01) |
| *B60W 10/11* | (2012.01) |
| *B60W 10/113* | (2012.01) |
| *F16H 59/44* | (2006.01) |
| *F16H 59/54* | (2006.01) |
| *F16H 61/02* | (2006.01) |
| *B60W 30/02* | (2012.01) |
| *F16H 63/46* | (2006.01) |
| *B60W 30/182* | (2012.01) |
| *F16H 59/36* | (2006.01) |
| *F16H 59/00* | (2006.01) |

(52) U.S. Cl.
CPC .......... *B60W 10/113* (2013.01); *B60W 30/02* (2013.01); *B60W 30/182* (2013.01); *F16H 59/44* (2013.01); *F16H 59/54* (2013.01); *F16H 61/0204* (2013.01); *F16H 61/0213* (2013.01); *F16H 63/46* (2013.01); *B60W 2510/0604* (2013.01); *B60W 2510/0638* (2013.01); *B60W 2520/10* (2013.01); *B60W 2540/04* (2013.01); *B60W 2540/12* (2013.01); *B60W 2540/16* (2013.01); *B60W 2710/021* (2013.01); *B60W 2710/022* (2013.01); *B60W 2710/025* (2013.01); *B60W 2710/0677* (2013.01); *B60W 2710/1005* (2013.01); *F16H 2059/006* (2013.01); *F16H 2059/366* (2013.01); *F16H 2061/0227* (2013.01); *F16H 2061/0244* (2013.01)

(58) Field of Classification Search
CPC .... B60W 10/06; B60W 10/11; B60W 10/113; F16H 59/44; F16H 59/54; F16H 61/0204; F16H 61/0213
See application file for complete search history.

(56) References Cited

OTHER PUBLICATIONS

Patent Cooperation Treaty, "Notification of Transmittal of the International Search Report and the Written Opinion of the International Searching Authority, or the Declaration, from PCT Application No. PCT/US2016/056409, dated Dec. 20, 2016", "from Foreign Counterpart of U.S. Appl. No. 15/290,577", dated Dec. 20, 2016, pp. 1-12.

* cited by examiner

CONTROL SCENARIOS

| SCENARIO | Inputs | | | | | | | | | | | | | | Outputs | | | |
|---|---|---|---|---|---|---|---|---|---|---|---|---|---|---|---|---|---|---|
| | Discrete | | | | | | | | | | | | | Variable | | Discrete | | | Variable |
| | Shift Up | Shift Down | Gear Reverse | Gear Neutral | Gear 1st | Gear 2nd | Gear 3rd | Gear 4th | Gear 5th | Manual | Auto Sport | Auto Economy | Auto Work | Brake | Throttle Position | Ground Speed | Engine Speed | Shift Up | Shift Down | Engine Power Cut | Clutch Pressure |
| Launch 1.1 | | | | X | | | | | | | | | | | X | | X | | | | |
| Launch 1.2 | | | | X | | | | | | | | | | X | X | | X | | | | |
| Launch 1.3 | | | | | X | | | | | | | | | X | X | | X | | | | |
| Launch 1.4 | | | | | X | | | | | | | | | | X | | X | | | | X |
| Launch 1.5 | | | | | X | | | | | | | | | | | | X | | | | |
| Launch 1.6 | | X | | | | | | | | | | | | | X | | X | | | | |
| Launch 1.7 | | X | | | | | | | | | | | | | X | | X | | | | X |
| Launch 1.8 | | X | | | | | | | | | | | | | | | X | | | | |
| Man. Shift 2.1 | X | | | X | | | | | | X | | | | | X | X | | X | | X | X |
| Man. Shift 2.2 | | X | | X | | | | | | X | | | | | X | X | | | X | X | X |
| Man. Shift 2.3 | X | | | | X | X | X | X | X | | | | | | X | X | | X | | X | X |
| Man. Shift 2.4 | | X | | | X | X | X | X | X | | | | | | X | X | | | X | X | X |
| Auto Shift 3.1 | | | | | | | | | | | X | X | X | | X | | | X | X | X | X |
| Auto Shift 3.2 | | | | | | | | | | | X | X | X | | X | | | | X | X | X |
| Stopping 4.1 | | | | X | | | | | | | | | | X | X | X | | | | | X |
| Stopping 4.2 | | X | | | | | | | | | | | | X | X | X | | | | | X |
| Override 5.1 | X | | | | X | X | X | X | X | | X | X | X | | X | | X | X | | X | X |
| Override 5.2 | | X | | | | X | X | X | X | | X | X | X | | X | | X | | X | X | X |

SHIFT CONTROL

CROSS-REFERENCE TO RELATED APPLICATIONS

This Application claims priority to U.S. Provisional Application Ser. No. 62/240,350, same title herewith, filed on Oct. 12, 2015, which is incorporated in its entirety herein by reference.

BACKGROUND

Recreational vehicles such as, but not limited to, all-terrain vehicles (ATVs) and utility task vehicles (UTVs), include systems to shift through gearing of transmission during operation of the vehicles. Shifting parameters are traditionally set at the manufacture based on performance and anticipated use. This setup, however, is limiting when a vehicle shifting configuration is desired outside of typical anticipated use.

For the reasons stated above and for other reasons stated below which will become apparent to those skilled in the art upon reading and understanding the present specification, there is a need in the art for effective and efficient method of changing shifting parameters of a transmission.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a shift control is provided. The shift control includes an operator input, a memory, and a controller. The memory is used to store a plurality of shifting maps. Each shifting map is associated with a select input signal received from the operator input. At least some of the shifting maps include launch aggressiveness parameters based on anticipated vehicle use. The controller is in communication with the operator input and the memory. The controller is configured to control shifting of a transmission based at least in part on a shifting map stored in the memory associated with an input signal received from the operator input.

In another embodiment of the shift control, the controller is further configured to implement slipper function instructions stored in the memory during a downshift. The slipper function instructions controlling clutch pressure during the downshift to limit effects of engine braking.

In another embodiment of the shift control, at least one of a hydraulically and an electrically controlled clutch actuator is configured to selectively control engagement of a clutch to regulate the clutch pressure during activation of the slipper function instructions by the controller.

In another embodiment of the shift control, the controller further includes at least one of a brake signal input, a throttle position input, a ground speed input and an engine speed input.

In another embodiment of the shift control, the controller further includes at least one of a shift up output, a shift down output, an engine power cut output and a clutch pressure output.

In another embodiment of the shift control, the launch aggressiveness parameters include higher engine RPM in a sport mode then in a work mode where the engine RPM is set just above idle.

In another embodiment of the shift control, the shift maps stored in the memory include at least one of a manual mode shift map, an auto sport mode shift map, an auto economy shift map and an auto work mode shift map.

In another embodiment of the shift control, the controller is further configured to implement shift override instructions stored in the memory based at least in part on an override input signal from the operator input.

In yet another embodiment, a recreation vehicle is provided. The vehicle includes an engine, a transmission, a clutch, a clutch actuator, a drivetrain, a brake system, an operator input, memory and a controller. The transmission is in rotational communication with the engine. The clutch is in operational communication with the transmission to selectively disengage the rotational communication between the engine and the transmission during a shift in gearing of the transmission. The clutch actuator is coupled to activate the clutch. The drivetrain is in operational communication with an output of the transmission to move the vehicle. The brake system is in operational communication with the drivetrain to resist movement of the vehicle. The operator input is configured to generate operator input signals. At least some of the operator input signals are based on select operation modes of the vehicle. The memory is used to store a plurality of shifting maps. Each shifting map is associated with a select operator input signal from the operator input. The controller is in communication with the operator input and the memory. The controller is further configured to control activation of the clutch actuator and shifting of the transmission based at least in part on a selected shifting map stored in the memory associated with an operator input signal from the operator input. The controller is further configured to implement slipper function instructions stored in the memory during a downshift. The slipper function instructions controlling clutch pressure during the downshift to limit effects of engine braking.

In another embodiment, the recreational vehicle further includes an engine speed sensor, a ground speed sensor, a throttle sensor, and a brake sensor. The engine speed sensor is operationally coupled to the engine to sense the engine speed. The ground speed sensor is operationally coupled to the drivetrain and is configured to determine the ground speed of the vehicle. The throttle sensor is operationally coupled to a throttle and is configured to generate a throttle position signal based on a throttle position. The brake sensor is operationally coupled to the brake system. The brake sensor generates a brake signal when the brake system is activated. The controller is configured to receive at least one of an engine speed signal from the engine speed sensor, a ground speed sensor signal from the ground speed sensor, a throttle sensor signal from the throttle sensor, and a brake sensor signal from the brake sensor. The at least one signal is used at least in part in controlling the activation of the clutch actuator and shifting of the transmission.

In another embodiment of the recreational vehicle, the transmission is an automated manual transmission using one of a single clutch and dual clutch technology.

In another embodiment of the recreational vehicle, the transmission is a multispeed sequential shifted transmission.

In another embodiment of the recreational vehicle, the shift maps stored in the memory include at least one of a manual mode shift map, an auto sport mode shift map, an auto economy shift map, and an auto work mode shift map.

In another embodiment of the recreational vehicle, the clutch actuator is hydraulically controlled to selectively control engagement of the clutch in regulating clutch pressure during activation of the slipper function.

In another embodiment of the recreational vehicle, the controller is further configured to implement shift override instructions stored in the memory based at least in part on an override input signal from the operator input.

In still another embodiment, a method of controlling the shifting of a vehicle is provided. The method includes receiving an operator input signal. A shift map is retrieved from memory that is associated with the operator input signal. The shift map includes slipper function instructions to implement during a downshift. The slipper function controlling clutch pressure during the downshift to limit effects of engine braking. Shifting of a transmission is based on the shift map.

In another embodiment of the method, an automatic shift pattern set out in the shift map is overridden upon receiving an override signal.

In another embodiment of the method, an operational mode of the shift of the transmission is changed to a manual mode upon overriding the automatic shift pattern.

In another embodiment of the method, the retrieved shift map has a launch aggressiveness specific to a mode of operation indicated by the operator input signal.

In another embodiment of the method, the controlling of the clutch pressure in implementing the slipper function further includes controlling a hydraulically controlled clutch actuator.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a shift control system for a transmission using shift maps set up by an original equipment manufacture (OEM) that are selectable by an operator of the vehicle. Hence, the operator can set the shifting of transmission based on the operator's needs. In one embodiment, launch aggressiveness can be selectable by the operator of the vehicle depending on the vehicle use. Moreover in one embodiment, a slipper function is tunable (not fixed) to improve vehicle stability as well as protect vehicle components. In addition, in an embodiment, a shift override function allows the operator to override automatic shifting momentarily so that an appropriate gear can be chosen for an upcoming event the shift control system cannot predict.

Figure 1:
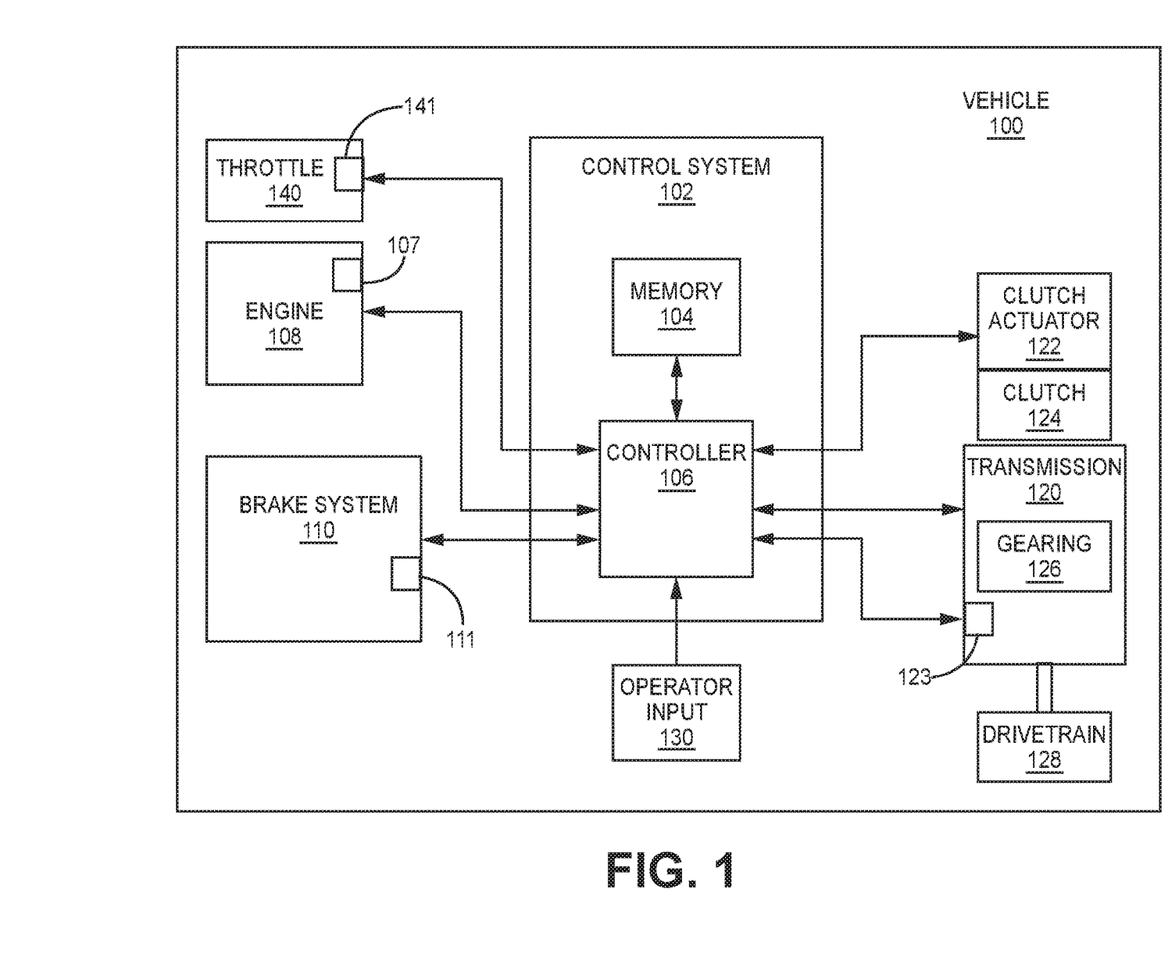
FIG. 1 is a block diagram of vehicle including a shift control of one embodiment of the present invention.

Referring to FIG. 1, a general block diagram of a 100 vehicle and its systems, such as a recreational vehicle, is illustrated. The vehicle 100 is illustrated as including a control system 102, an operator input 130, throttle 140, an engine 108, a brake system 110, a clutch 124, a clutch actuator 122, a transmission 120, and a drivetrain 128. The control system 102 includes a controller 106 and a memory 104. In general, the controller 106 (processor) may include any one or more of a microprocessor, a digital signal processor (DSP), an application specific integrated circuit (ASIC), a field program gate array (FPGA), or equivalent discrete or integrated logic circuitry. In some example embodiments, controller 106 may include multiple components, such as any combination of one or more microprocessors, one or more controllers, one or more DSPs, one or more ASICs, one or more FPGAs, as well as other discrete or integrated logic circuitry. The functions attributed to controller 106 herein may be embodied as software, firmware, hardware, or any combination thereof. Memory 104 may include computer-readable instructions that, when executed by controller 106 provide functions of the vehicle 100. Such functions may include the functions of shifting the transmission 120. The computer readable instructions may be encoded within the memory 104. Memory 104 may comprise computer readable storage media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium. The controller 106 in one embodiment is a transmission controller unit (TCU). In another embodiment, the controller 106 is an engine control unit (ECU). In further other embodiments the controller 106 is part of a transmission control module or a main engine control module or may be located in a different system of the vehicle 100.

The controller 106 is in communication with an engine sensor 107 of the engine 108 to receive then current operating information of the engine 108 and in some embodiments, to control operations of the engine. The controller 106 is further in communications with a brake sensor 111 of the brake system 110 to receive then current operating information of the brake system 110. The transmission 120 includes a gearing 126 that is selectively operationally arranged to change gearing of the transmission 120. In one embodiment, the transmission 120 is a multispeed sequentially shifted transmission for a recreational vehicle. In an embodiment, the transmission 120 is automated manual transmission (AMT) using a single or dual clutch technology. In non-sequentially shifted transmission embodiment additional shift actuators are implemented. The controller 106 is in communication with the clutch actuator 122 to selectively control operations of the clutch actuator 122. The clutch actuator 122 is designed to activate the clutch 124 to disconnect a rotational communication between the engine 108 and the transmission 120 so that gearing configurations of the gearing 126 in the transmission 120 can be shifted into a different gear. In one embodiment, the clutch 124 is a wet clutch that is hydraulically actuated with a hydraulic clutch actuator 122. In another embodiment, the clutch 124 is a dry clutch. In one embodiment of the dry clutch, the clutch 124 is activated by a spring clutch actuator 122. Further in another embodiment, an electrically controlled clutch activator is used. Moreover, the logic used in embodiments to regulate shifting of the transmission 120 can be applied to any type of clutch system where the clutch torque is proportional to a control signal, whether that signal is mechanical, electrical, hydraulic or otherwise. In operation, the controller 106 signals the clutch actuator 122 to activate the clutch 124. Once the clutch 124 is activated, the controller 106 signals the transmission 120 to shift gearing.

Figure 2:
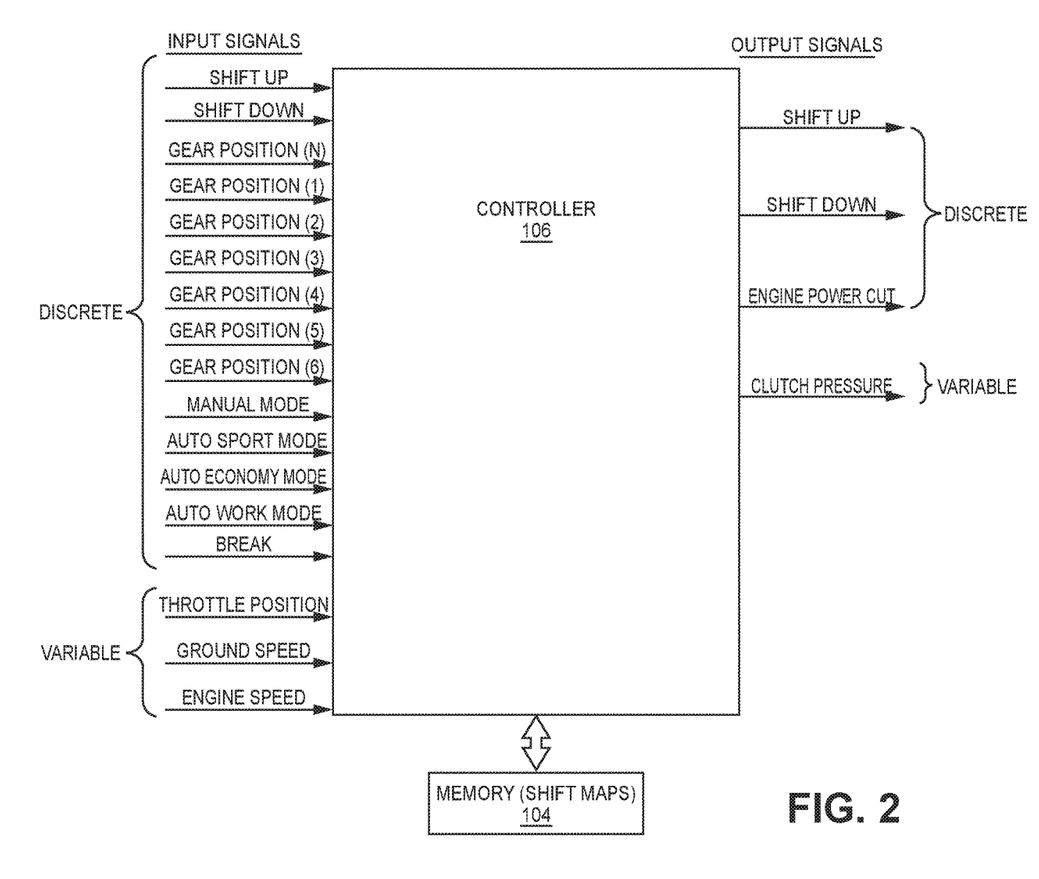
FIG. 2 is an illustration of input and output signal to the controller in one embodiment of the present invention.

The controller 106 receives various inputs from the vehicle systems in determining shift operations of the transmission 120. Vehicle sensors associated with the vehicle systems may transmit their signals directly to the controller 106. Also, signals may be first sent to a different controller, such as but not limited to, a main engine controller and then communicated to the controller 106. In one embodiment, the communication to the controller 106 is done by a controller area network (CAN) communication protocol. In other embodiments other communication protocols are used. Referring to FIG. 2, an illustration of possible input signals and output signals to the controller 106 is provided. The input signals include input discrete signals and input variable signals. The discrete input signals include shift up, shift down, gear position neutral (N), gear position 1, gear position 2, gear position 3, gear position 4, gear position 5, gear position 6, manual mode, auto sport mode, auto economy mode, auto work mode, and brake. The variable input signals include throttle position, ground speed, and engine speed. The throttle input in one embodiment is provided by operator input 130. The ground speed input, in an embodiment, is provided by a ground speed sensor 123 in the transmission 120. The engine speed input is provided by an engine speed sensor 107. The output signals include output discrete signals shift up, shift down, and engine power cut. The output variable signal includes clutch pressure. The memory 104 includes shift maps implemented by the controller 106 based on input signals.

As discussed above, the discrete input signals; shift up, shift down, gear position neutral (N), gear position 1, gear position 2, gear position 3, gear position 4, gear position 5, gear position 6, manual mode, auto sport mode, auto economy mode, auto work mode are input to the controller 106 via the operator input 130 as illustrated in FIG. 1. The operator input 130 may include one or more dials, switches, buttons, levers, touch displays, or any other type of user input system that conveys a select signal to the controller 106. The auto sport mode is a mode that regulates the transmission so the vehicle has high performance characteristics. The auto economy mode is a mode that regulates the transmission so the vehicle achieves a relatively high miles per gallon operating performance. The work mode is a mode that that regulates the transmission so the vehicles performance in a work situation is optimized (i.e. such as hauling or plowing where low power torque is needed). Hence the operator is able to select how the transmission should perform based at least in part on desired operating characteristics of the vehicle. The discrete brake input signal is supplied to the controller 106 via the brake sensor 111 of the brake system 110 of FIG. 1. The discrete brake input signal is generated upon activation of at least one brake of the vehicle. The engine speed input is provided by an engine speed sensor 107. In an embodiment, the throttle position is supplied to the controller 106 via throttle sensor 141. The ground speed variable input signal is supplied to the controller 106 via the speed sensor 123. The speed sensor 123 may be, but is not limited to, a hall-effect sensor, sensing rotation of a gear in the gearing 126 of the transmission 120 that is in rotational communication with the drivetrain 128 of the vehicle 100.

Figure 3:
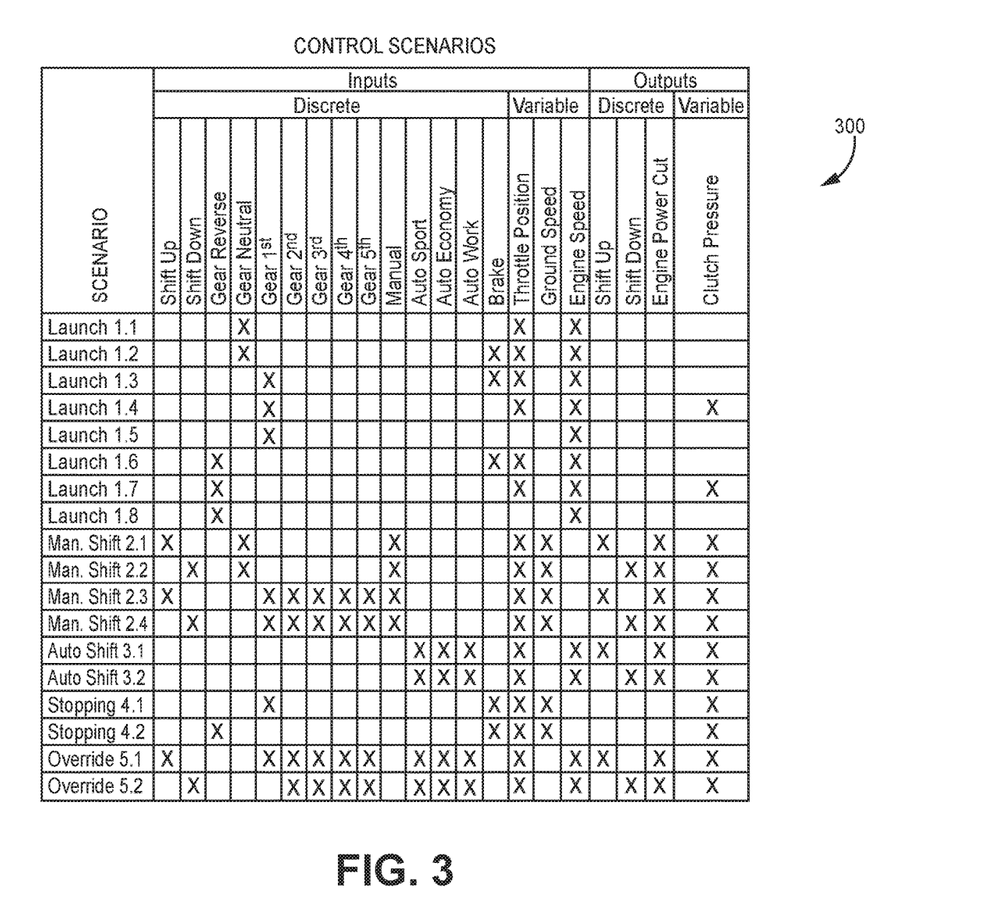
FIG. 3 is an input/output table matrix of one embodiment of the present invention.

Based in part on the inputs described above, the controller 106 outputs the output signals to the clutch actuator 122 and the transmission 120 to control the shifting of the transmission 120. As discussed above, the output signals include the discrete signals of shift up, shift down, and engine power cut. The variable signal includes the clutch pressure. In embodiments, the memory 104 includes shift maps that the controller 106 uses along with inputs described above to operate the transmission 120. Referring to FIG. 3 an example input/output matrix 300 of an embodiment is provided. An X in a box for a discrete input or output means that the system is receiving that input signal or sending that output signal. These signals may be in the form of, but not limited to, vehicle voltage or contact closure. An X in a variable input or output box means that a variable signal is being received or a variable output is being sent. Variable inputs may, but are not limited to, voltages or resistances that are scaled to a physical value. Variable outputs may be variable voltages, variable resistances, a variable pulse width modulated signal, or any other type of signal.

Vehicle launch is defined as the act of positively accelerating from a stop or near stop. The vehicle launch must protect the clutch from damage, avoid stalling the engine, and have adequate drivability. Various launch scenarios shown in Table 300 are discussed below:

| | | |
|---|---|---|
| 1.1. | | Neutral-Throttle Applied-Clutch remains open. |
| 1.2. | | Neutral-Throttle Applied, Brake Applied-Clutch remains open. |
| 1.3. | | $1^{st}$ Gear-Throttle Applied, Brake Applied-Clutch remains open. Once the brake is released, the clutch closes quickly. This simulates "dumping the clutch" in a traditional manual transmission. In this case the brake acts as a clutch override. |
| 1.4. | | $1^{st}$ Gear-Throttle Applied-Clutch closes proportional to throttle. |
| 1.5. | | $1^{st}$ Gear-Throttle not applied-Clutch remains open. |
| 1.6. | | Reverse-Throttle Applied, Brake Applied-Clutch remains open. |
| 1.7. | | Reverse-Throttle Applied-Clutch closes proportional to throttle. |
| 1.8. | | Reverse-Throttle not applied-Clutch remains open. |

A shortcoming of the systems currently available in the marketplace is that the launch mechanisms are tuned for only one condition. The engine speed during engagement of the launch mechanism is set by the OEM and is not easily adjustable by the end user. Auto mode embodiments of the present invention use different engagement speeds and aggressiveness depending on which shift map is selected by the user. For example, in the sport mode, the engagement would occur at a higher engine RPM to allow for faster initial acceleration, while in work mode, engagement would occur just above idle to improve low speed maneuverability.

Manual shifting is defined as switching from one discrete gear ratio to another discrete gear ratio or from a discrete ratio to neutral. Additional logic is added in some cases for drivetrain protection or vehicle handling. The clutch 124 opens, shift mechanism of the transmission 120 is energized, clutch 124 closes at rate proportional to throttle position and shift mode chosen. Various manual shift scenarios shown in Table 300 of FIG. 3 are discussed below:

| | |
|---|---|
| 2.1 | Neutral to $1^{st}$ |
| 2.2 | Neutral to Reverse |
| 2.3 | Upshift ($1^{st}$ to $2^{nd}$, $2^{nd}$ to $3^{rd}$, $3^{rd}$ to $4^{th}$, etc.) |
| 2.4 | Downshift ($4^{th}$ to $3^{rd}$, $3^{rd}$ to $2^{nd}$, etc.) |

Figure 4:
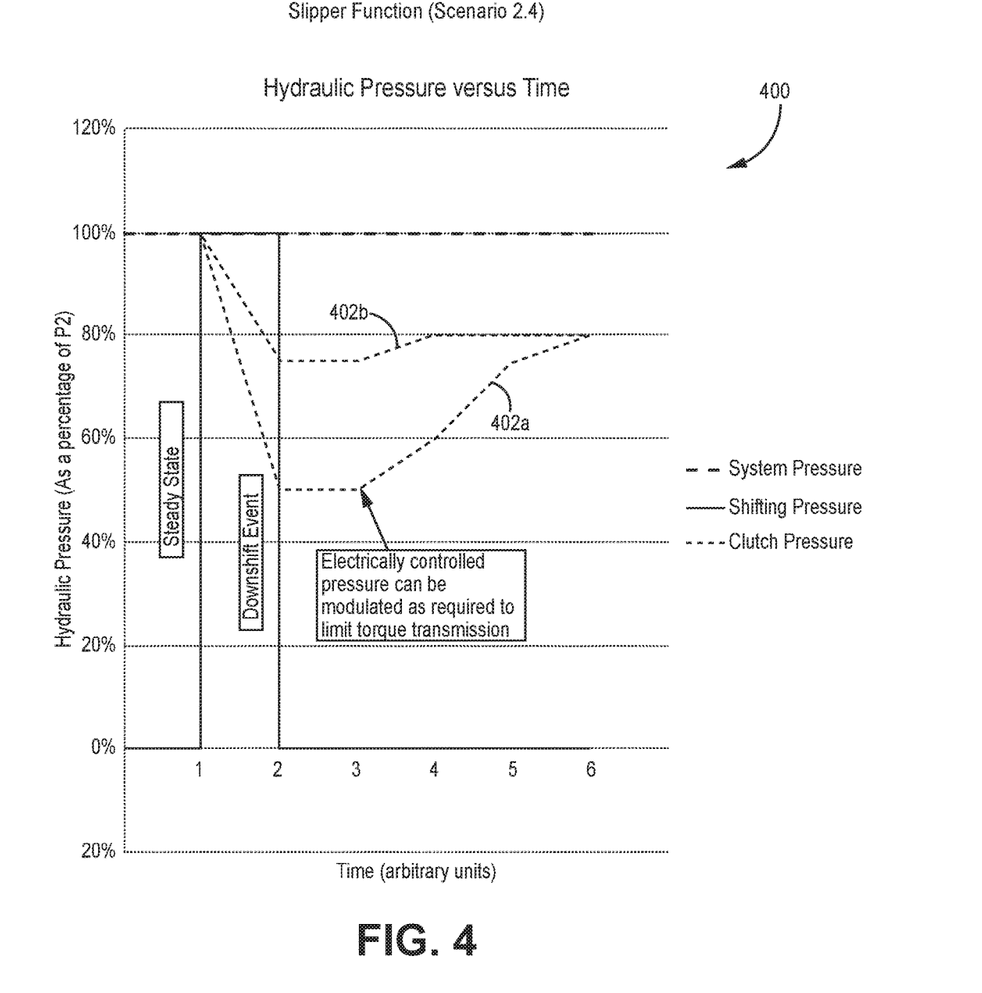
FIG. 4 is a slip function graph illustrating a slip function of an embodiment of the present invention.

In downshift scenario 2.4 the discrete inputs in this scenario are the shift down and the select gear to shift down to, the variable inputs include the throttle position and the ground speed. The discrete outputs include shift down and engine power cut. The variable output is the clutch pressure. This is illustrated in graph 300 of FIG. 3. In embodiments, a slipper function is added to the downshift. The slipper function regulates the clutch pressure (variable output) by a hydraulic control system in an embodiment. The slipper function limits the effects on engine braking during downshifting, when the clutch reengagement pressure is limited. The pressure limitation occurs for a specified period of time or until ground speed slows such that engine speed will not exceed a maximum threshold, whichever is shortest. As discussed above, embodiments use a hydraulic control system, such as controller 106 and clutch actuator 112 discussed above, for the slipper function. With the hydraulic control system, the torque can be controlled as desired and the torque can be set differently for the different driving modes, or vehicle application. This function improves machine controllability by reducing the likeliness of losing traction during downshift events, as well as protecting engine driveline systems from excessive torques. A graph illustrating the slip function in a down shift is illustrated in the slipper function graph 400 of FIG. 4. As illustrated, the clutch pressure is modulated as required to limit torque to the transmission by the hydraulic control system. The pressure can be set as required to achieve any level of torque between zero and a maximum. FIG. 4 illustrates the versatility by showing a first possible clutch pressure profile 402a and a second possible clutch pressure profile 402b.

Figure 5:
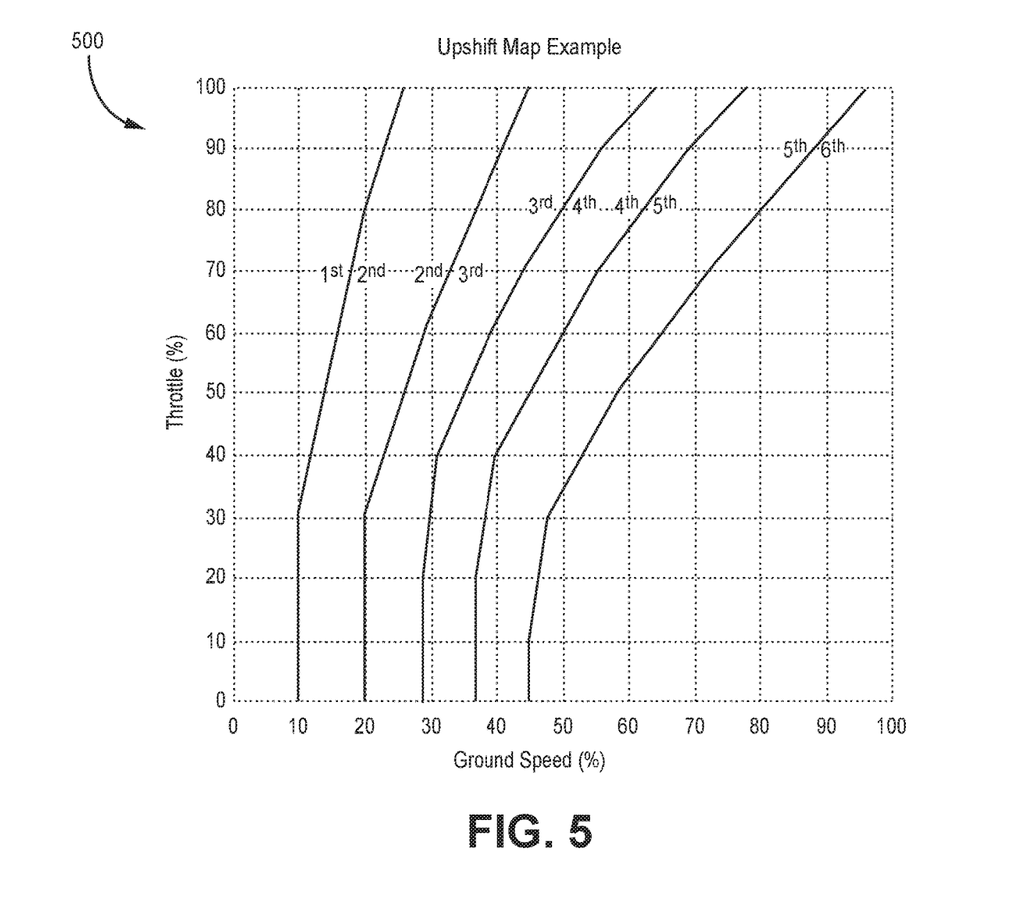
FIG. 5 is an illustration of an upshift shift map in one embodiment of the present invention.
Figure 6:
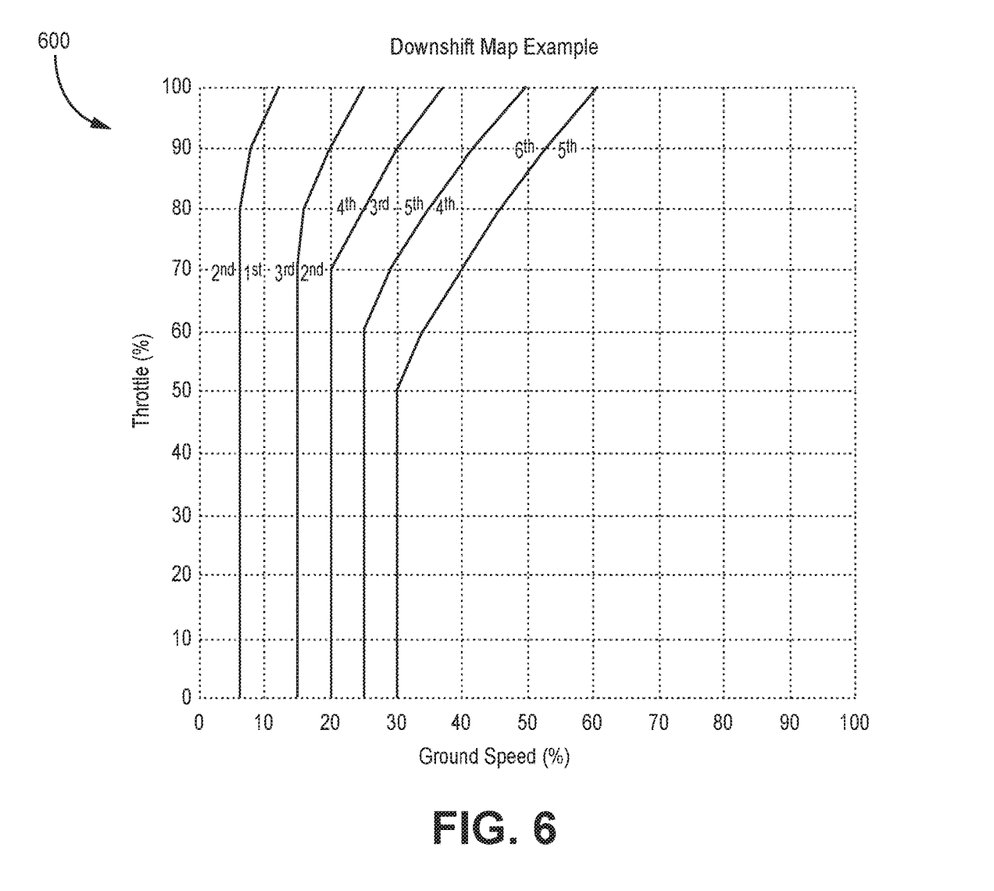
FIG. 6 is an illustration of a downshift shift map in anther embodiment of the present invention.

In an embodiment, when an automatic mode is selected the decision on when to shift from one gear to the next is made by a controller 106. As discussed above, the controller 106 can be the vehicle ECU, a transmission control module, or some other device. The decisions are based on shift maps that take into account throttle position, gear position, ground speed, and other factors. FIGS. 5 and 6 illustrated generic shift maps 500 and 600 representative of what would be stored in memory 104 for use by the controller 106. In particular, FIG. 5 illustrates an upshift map, and FIG. 6 illustrates a down shift map. Multiple maps will be created for different shift modes, operating conditions, or vehicle application. The shift maps are operator selectable in an embodiment depending on the intended use of the operator.

In an embodiment, when the operator selects the automatic mode (scenario 3.1 or 3.2 of table 300 of FIG. 3), the throttle is fully depressed, the vehicle remains in gear 1 until it reaches maximum allowable engine speed (shift speed), the controller 106 signals to shift up from gear 1 to gear 2, engine power is cut, the clutch 124 is opened, the shift cylinder is energized, gear change occurs, the shift cylinder is de-energized, the clutch 124 is closed, and engine power is returned. The clutch 124 opens and closes at a rate proportional to throttle position. In general this shifting event is repeated for all conditions. Shift speed is varied depending on throttle position. Also, the operator may select from multiple shifting modes. Each mode will have its own set of shift points for each gear. Maps of the shift points are stored in the memory 104 and implemented by the controller 106. Both upshift and downshift maps are included. The auto shift scenarios of table 300 of FIG. 3 are discussed below:

| | |
|---|---|
| 3.1 | Upshift-Shift decision is made by TCU or ECU and is determined by maps that take into account throttle position, ground speed, gear position, and shift mode. |
| 3.2 | Downshift-Shift decision is made by TCU or ECU and is determined by maps that take into account throttle position, ground speed, gear position, and shift mode. Stopping scenarios of table 300 of FIG. 3 are discussed below: |
| 4.1 | Brake applied in $1^{st}$ gear and ground speed below predetermined threshold. |
| 4.2 | Brake applied in Reverse gear and ground speed below predetermined threshold. |

One major disadvantage of automatic transmissions in off road applications is that while in automatic mode the vehicle may be in the "wrong gear" for a particular event. This happens because there are transient events that the vehicle controller cannot predict. For example, a vehicle could be traveling on a smooth trail using a less aggressive map and very little throttle. The operator may then see an obstacle or severe change in terrain, and depresses the throttle 140 to navigate the event. Unfortunately, by the time the system responds, the event has either passed or the shift occurs during the event. Both cases are very undesirable. Embodiments, address this disadvantage with shifting override functions. Performing the physical event is straight forward. The operator is allowed to shift up or down while in auto mode using the manual shift interface because they desire to be in a gear other than what the current automatic shifting logic dictates. In one embodiment, after the operator requests to manually shift while in automatic mode, the vehicle changes to manual mode and remains in manual mode until the automatic mode is depressed again. The auto override scenarios of table 300 of FIG. 3 are discussed below:

| | |
|---|---|
| 5.1 | Upshift ($1^{st}$ to $2^{nd}$, $2^{nd}$ to $3^{rd}$, $3^{rd}$ to $4^{th}$, etc.) |
| 5.2 | Downshift ($4^{th}$ to $3^{rd}$, $3^{rd}$ to $2^{nd}$, etc.) |

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A shift control comprising:
an operator input configured to allow the operator to select a desired operating performance of a transmission;
a memory to store a plurality of shifting maps, each shifting map associated with a select input signal from the operator input, at least some of the shifting maps including launch aggressiveness parameters based on anticipated vehicle use; and
a controller in communication with the operator input and the memory, the controller configured to control shifting of the transmission based at least in part on a shifting map of the plurality of shift maps stored in the memory that is associated with a received input signal from the operator input, wherein the controller is further configured to implement slipper function instructions stored in the memory during a downshift, the slipper function instructions controlling clutch pressure during the downshift to limit effects of engine braking.

2. The shift control of claim 1, further comprising: one of a hydraulically and an electrically controlled clutch actuator configured to selectively control engagement of a clutch to regulate the clutch pressure during activation of the slipper function instructions by the controller.

3. The shift control of claim 1, wherein controller further includes at least one of a brake signal input, a throttle position input, a ground speed input and an engine speed input.

4. The shift control of claim 1, wherein controller further includes at least one of a shift up output, a shift down output, an engine power cut output and a clutch pressure output.

5. The shift control of claim 1, wherein the launch aggressiveness parameters include higher engine RPM in a sport mode then in a work mode where the engine RPM is set just above idle.

6. The shift control of claim 1, wherein the shift maps stored in the memory include at least one of a manual mode shift map, an auto sport mode shift map, an auto economy shift map and an auto work mode shift map.

7. The shift control of claim 1, wherein the controller is further configured to implement shift override instructions stored in the memory based at least in part on an override input signal from the operator input.

8. A recreation vehicle comprising:
an engine;
a transmission in rotational communication with the engine;
a clutch in operational communication with the transmission to selectively disengage the rotational communication between the engine and the transmission during a shift in gearing of the transmission;
a clutch actuator coupled to activate the clutch;
a drivetrain in operational communication with an output of the transmission to move the vehicle;
a brake system in operational communication with the drivetrain to resist movement of the vehicle;
an operator input configured to generate operator input signals that allow the operator to select a desired operating performance of a transmission, at least some of the operator input signals based on select operation modes of the vehicle;
a memory to store a plurality of shifting maps, each shifting map associated with a select operator input signal from the operator input; and
a controller in communication with the operator input and the memory, the controller further configured to control activation of the clutch actuator and shifting of the transmission based at least in part on a selected shifting map of the plurality of shifting maps stored in the memory that is associated with a received operator input signal from the operator input, the controller is further configured to implement slipper function instructions stored in the memory during a downshift, the slipper function controlling clutch pressure during the downshift to limit effects of engine braking.

9. The recreational vehicle of claim 8, further comprising:
an engine speed sensor operationally coupled to the engine to sense an engine speed;
a ground speed sensor operationally coupled to the drivetrain configured to determine a ground speed of the vehicle;
a throttle sensor operationally coupled to a throttle configured to generate a throttle position signal based on a throttle position;
a brake sensor operationally coupled to the brake system to generate a brake signal when the brake system is activated; and
the controller configured to receive at least one of an engine speed signal from the engine speed sensor, a ground speed sensor signal from the ground speed sensor, a throttle sensor signal from the throttle sensor and a brake sensor signal from the brake sensor used at least in part in controlling the activation of the clutch actuator and shifting of the transmission.

10. The recreational vehicle of claim 8, wherein the transmission is an automated manual transmission using one of a single clutch and dual clutch technology.

11. The recreational vehicle of claim 8, wherein the transmission is a multispeed sequential shifted transmission.

12. The recreational vehicle of claim 8, wherein the shift maps stored in the memory include at least one of a manual mode shift map, an auto sport mode shift map, an auto economy shift map, and an auto work mode shift map.

13. The recreational vehicle of claim 8, further wherein the clutch actuator is hydraulically controlled to selectively control engagement of the clutch in regulating clutch pressure during activation of the slipper function.

14. The recreational vehicle of claim 8, wherein the controller is further configured to implement shift override instructions stored in the memory based at least in part on an override input signal from the operator input.

15. A method of controlling a shifting of a vehicle, the method comprising:
receiving an operator input signal regarding a desired operating performance of a transmission;
retrieving a shift map from memory associated with the operator input signal, the shift map including slipper function instructions to implement during a downshift, the slipper function controlling clutch pressure during the downshift to limit effects of engine braking; and
controlling shifting of the transmission based on the shift map.

16. The method of claim 15, further comprising:
overriding an automatic shift pattern set out in the shift map upon receiving an override signal.

17. The method of claim 16, further comprising:
changing an operational mode of the shift of the transmission to a manual mode upon overriding the automatic shift pattern.

18. The method of claim 15, wherein the retrieved shift map has a launch aggressiveness specific to a mode of operation indicated by the operator input signal.

19. The method of claim 15, wherein controlling the clutch pressure in implementing the slipper function further comprises:
controlling a hydraulically controlled clutch actuator.

* * * * *